US012499973B2

(12) United States Patent
Verzi et al.

(10) Patent No.: US 12,499,973 B2
(45) Date of Patent: Dec. 16, 2025

(54) SEQUENCE-BASED ANOMALY DETECTION WITH HIERARCHICAL SPIKING NEURAL NETWORKS

(71) Applicant: National Technology & Engineering Solutions of Sandia, LLC, Albuquerque, NM (US)

(72) Inventors: Stephen Joseph Verzi, Albuquerque, NM (US); Craig Michael Vineyard, Cedar Crest, NM (US); James Bradley Aimone, Keller, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 791 days.

(21) Appl. No.: 17/890,843

(22) Filed: Aug. 18, 2022

(65) Prior Publication Data

US 2022/0406408 A1 Dec. 22, 2022

Related U.S. Application Data

(63) Continuation-in-part of application No. 16/436,744, filed on Jun. 10, 2019, now Pat. No. 11,436,475.

(51) Int. Cl.
*G06N 3/049* (2023.01)
*G06N 3/08* (2023.01)
(Continued)

(52) U.S. Cl.
CPC .............. *G16B 30/00* (2019.02); *G06N 3/049* (2013.01); *G06N 3/08* (2013.01); *G16B 40/20* (2019.02)

(58) Field of Classification Search
CPC ...... G16B 30/00; G16B 40/20; G06N 3/0472; G06N 3/049; G06N 3/0481; G06N 3/04
See application file for complete search history.

(56) References Cited

U.S. PATENT DOCUMENTS 10,268,836 B2 * 4/2019 Ukil ..................... G06F 21/6245
11,169,514 B2 11/2021 Song et al.

FOREIGN PATENT DOCUMENTS

| CN | 105205114 A | 12/2015 |
|---|---|---|
| WO | 2017199233 A1 | 11/2017 |
| WO | 2019125419 A1 | 6/2019 |

OTHER PUBLICATIONS

Horiuchi et al. "Fast Median Filter with Various Kernel Sizes", SPIE, Mar. 2019, pp. 6.*

(Continued)

*Primary Examiner* — Li Wu Chang
(74) *Attorney, Agent, or Firm* — Yee & Associates, P.C.; Gregory M. Doudnikoff; Merle W. Richman

(57) ABSTRACT

Anomaly detection for streaming data is provided. A spiking neural network receives inputs of streaming data, wherein each input is contained within a number of neighborhoods and converts the inputs into phase-coded spikes. A median value of each input is calculated for each size neighborhood containing the input, and an absolute difference of each input from its median value is calculated for each size neighborhood. From the absolute differences, a median absolute difference (MAD) value of each input is calculated for each size neighborhood. It is determined whether the MAD value for any size neighborhood exceeds a respective threshold. If the MAD value exceeds its threshold, an anomaly indication is output for the input. If none of the MAD values for the neighborhoods exceeds its threshold, a normal indication is output for the input.

24 Claims, 9 Drawing Sheets

(51) Int. Cl.
*G16B 30/00* (2019.01)
*G16B 40/20* (2019.01)

(56) References Cited

OTHER PUBLICATIONS

Houdrouge "Scalable Nearest Neighbour Algorithms for High Dimensional Data", Ecole Polytechnique—INF 513—M1 Project, 2018, pp. 15.*
Izakian et al. "Anomaly Detection in Time Series Data using a Fuzzy C-Means Clustering", IEEE, 2013, pp. 2513-2518.*
Van Overbeek et al., DNA Repair Profiling Reveals Nonrandom Outcomes at Cas9-Mediated Breaks, Molecular Cell, vol. 63, No. 4, Aug. 18, 2016, pp. 633-646/ https://www.cell.com/action/showPdf?pii=S1097-2765%2816%2930325-2.
Allen et al., "Predicting the mutations generated by repair of Cas9-induced double-strand breaks," Nature Biotechnology, vol. 37, Nov. 27, 2018, pp. 64-72. https://www.ncbi.nlm.nih.gov/pmc/articles/PMC6949135/.
Chuai et al., "DeepCRISPR: optimized CRISPR guide RNA design by deep learning," Genome Biology, vol. 19, No. 80, Jun. 26, 2018, 18 pages. https://genomebiology.biomedcentral.com/track/pdf/10.1186/s13059-018-1459-4.pdf.
Chakrabarti et al., "Target-Specific Precision of CRISPR-Mediated Genome Editing," Molecular Cell, vol. 73, No. 4, Feb. 21, 2019, pp. 699-713. https://www.cell.com/action/showPdf?pii=S1097-2765%2818%2931001-3.
Chen et al., "Massively parallel profiling and predictive modeling of the outcomes of CRISPR/Cas9-mediated double-strand break repair," Nucleic Acids Research, vol. 47, No. 15, Jun. 5, 2019, pp. 7989-8003. 7989-8003.
Arbab et al., "Determinants of Base Editing Outcomes from Target Library Analysis and Machine Learning," Cell, vol. 182, No. 2, Jul. 23, 2020, pp. 463-480. https://www.cell.com/action/showPdf?pii=S0092-8674%2820%2930632-2.
Kamiya et al., "A rapid method for detection of mutations induced by CRISPR/Cas9-based genome editing in common wheat," Plant Biotechnology (Tokyo), vol. 37, No. 2, Jun. 25, 2020, pp. 247-251. https://www.ncbi.nlm.nih.gov/pmc/articles/PMC7434669/pdf/plantbiotechnology-37-2-20.0404b.pdf.
Liang et al., "Genome-wide detection of CRISPR editing in vivo using GUIDE-tag," Nature Communications, vol. 13, No. 437, Jan. 21, 2022, 14 pages. https://www.nature.com/articles/s41467-022-28135-9.pdf.
Maciag et al., "Unsupervised Anomaly Detection in Stream Data with Online Evolving Spiking Neural Networks," Neural Networks, vol. 139, Jul. 2021, pp. 118-139. https://www.sciencedirect.com/science/article/pii/S0893608021000599?via%3Dihub.
Demertzis et al., "Gryphon: a semi-supervised anomaly detection system based on one-class evolving spiking neural network," Neural Computing & Applications, vol. 32, Issue 9, Jul. 27, 2019, pp. 4303-4314. https://doi.org/10.1007/s00521-019-04363-x.
Ahmad et al., "Unsupervised real-time anomaly detection for streaming data," Neurocomputing, vol. 262, Nov. 1, 2017, pp. 134-147. https://www.sciencedirect.com/science/article/pii/S0925231217309864?via%3Dihub.
Chen and Qiu, "Real-time Anomaly Detection for Streaming Data using Burst Code on a Neurosynaptic Processor," Design, Automation & Test in Europe Conference & Exhibition, 2017, pp. 205-207. http://hydrogen.syr.edu/~qqiu/papers/date2017-final.pdf.
Bäßler et al., "Unsupervised anomaly detection in multivariate time series with online evolving spiking neural networks," Machine Learning, vol. 111, Mar. 10, 2022, pp. 1377-1408. https://link.springer.com/content/pdf/10.1007/s10994-022-06129-4.pdf.
Stratton et al., "A Spiking Neural Network Based Auto-encoder for Anomaly Detection in Streaming Data," 2020 IEEE Symposium Series on Computational Intelligence (SSCI), Dec. 1-4, 2020, Canberra, Australia, pp. 1981-1988.
Yusob et al., "Anomaly Detection in Time Series Data Using Spiking Neural Network," Advanced Science Letters, vol. 24, No. 10, Oct. 10, 2018, pp. 7572-7576. https://doi.org/10.1166/asl.2018.12980.
Verzi et al, "Neural-Inspired Anomaly Detection," Springer Proceedings in Complexity. Springer, Champp., 2018, DOI: 10.1007/978-3-319-96661-8_21, pp. 202-209.
Chen and Wu, "Adaptive Impulse Detection Using Center-Weighted Medial Filters," IEEE Signal Processing Letter, vol. 4, No. 1, 2001, 3 pages.
Demertzis and Iliadis, "A Hybrid Network Anomaly and Intrusion Detection Approach Based on Evolving Spiking Neural Network Classification," 5th Conference on e-Democracy, Athens, Greece, Communications in Computer and Information Science, vol. 441, 2014, pp. 11-23.

* cited by examiner

SEQUENCE-BASED ANOMALY DETECTION WITH HIERARCHICAL SPIKING NEURAL NETWORKS

CROSS-REFERENCE TO RELATED APPLICATION

This application is a Continuation-in-Part of and claims priority to U.S. application Ser. No. 16/436,744, filed Jun. 10, 2019, the entirety of which is hereby incorporated by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to neural network computing, and more specifically, to detection of anomalies in a dataset by using spiking neural networks.

2. Description of the Related Art

Anomaly detection is an important problem in various fields of complex systems research including image processing, data analysis, physical security (for reduction of nuisance alarms), and cybersecurity (intrusion detection). Detection of anomalous data requires a contextual framework as well as a metric for comparison. For example, in images, the x and y axes provide a spatial context, and pixel-to-pixel value differences are reasonable for comparison. For video (as in physical security) or streaming data (as in cybersecurity), the time dimension adds to the context, and other features as well as combinations of features are relevant for comparison.

Neural networks are well suited to anomaly detection due to their ability to find interesting data points, objects, or events within large volumes of data. In the area of noise filtering, spiking neural networks are particularly well-suited because the range of pixel values is typically bounded and small, and spatial context is easily represented using two-dimensional networks of neurons, resulting in intrinsically parallel operation performance.

Therefore, it would be desirable to have a method and apparatus that take into account at least some of the issues discussed above, as well as other possible issues.

SUMMARY

An illustrative embodiment provides a computer-implemented method of anomaly detection for streaming data. The method comprises implementing a spiking neural network that performs the steps of: receiving inputs of streaming data, wherein each input is contained within a number of neighborhoods, wherein the neighborhoods comprise a number of increasingly larger symmetrical numbers of inputs preceding and following the input; converting the inputs into phase-coded spikes; calculating, from the phase-coded spikes, a median value of each input for each size neighborhood containing the input; calculating an absolute difference of each input from its median value for each size neighborhood containing the input; calculating, from the absolute differences, a median absolute difference (MAD) value of each input for each size neighborhood containing the input; determining for each input whether the MAD value for any size neighborhood containing the input exceeds a respective threshold, wherein; responsive to a determination that the MAD value of one or more neighborhoods exceeds its threshold, outputting an anomaly indication for the input; and responsive to a determination that none of the MAD values for the neighborhoods exceeds its threshold, outputting a normal indication for the input.

Another illustrative embodiment comprises a system for anomaly detection for streaming data. The system comprises a storage device configured to store program instructions; and one or more processors operably connected to the storage device and configured to execute the program instructions to implement a spiking neural network that causes the system to: receive inputs of streaming data, wherein each input is contained within a number of neighborhoods, wherein the neighborhoods comprise a number of increasingly larger symmetrical numbers of inputs preceding and following the input; convert the inputs into phase-coded spikes; calculate, from the phase-coded spikes, a median value of each input for each size neighborhood containing the input; calculate an absolute difference of each input from its median value for each size neighborhood containing the input; calculate, from the absolute differences, a median absolute difference (MAD) value of each input for each size neighborhood containing the input; determine for each input whether the MAD value for any size neighborhood containing the input exceeds a respective threshold, wherein; responsive to a determination that the MAD value of one or more neighborhoods exceeds its threshold, output an anomaly indication for the input; and responsive to a determination that none of the MAD values for the neighborhoods exceeds its threshold, output a normal indication for the input.

Another illustrative embodiment comprises a computer program product for anomaly detection for streaming data. The computer program product comprises a computer-readable storage medium having program instructions embodied thereon to implement a spiking neural network that performs the steps of: receiving inputs of streaming data, wherein each input is contained within a number of neighborhoods, wherein the neighborhoods comprise a number of increasingly larger symmetrical numbers of inputs preceding and following the input; converting the inputs into phase-coded spikes; calculating, from the phase-coded spikes, a median value of each input for each size neighborhood containing the input; calculating an absolute difference of each input from its median value for each size neighborhood containing the input; calculating, from the absolute differences, a median absolute difference (MAD) value of each input for each size neighborhood containing the input; determining for each input whether the MAD value for any size neighborhood containing the input exceeds a respective threshold, wherein; responsive to a determination that the MAD value of one or more neighborhoods exceeds its threshold, outputting an anomaly indication for the input; and responsive to a determination that none of the MAD values for the neighborhoods exceeds its threshold, outputting a normal indication for the input.

The features and functions can be achieved independently in various examples of the present disclosure or may be combined in yet other examples in which further details can be seen with reference to the following description and drawings.

DETAILED DESCRIPTION

The illustrative embodiments recognize and take into account one or more different considerations. For example, the illustrative embodiments recognize and take into account that anomaly detection is important problem requiring a contextual framework and comparison metric. Anomaly detection has applications in various fields of complex systems research including image processing, data analysis, physical security, cybersecurity, bio-security, and detecting events in time-series and/or sequential data.

The illustrative embodiments further recognize and take into account that neural networks are well suited to detecting anomalies within large volumes of data, so-called "Big Data."

The illustrative embodiments further recognize and take into account that detecting genomic edits (e.g., CRISPR-Cas9 technique) as well as potential chemical or biological exposure, where data is arranged sequentially, is important to bio-security.

The illustrative embodiments provide a spiking neural network with phase-coded spiking neurons as basic computational elements. Contextual framework is provided by multiple-sized neighborhoods of surrounding data. Multiple iterations of spiking adaptive median filtering are handled by routing outputs back to the neural network. The illustrative embodiments use genomic noise, characterized by frequencies of matches and mismatches in DNA or deep sequencing reads (where the sequencing may refer to DNA or RNA), to serve as features for anomaly detection.

Figure 1:
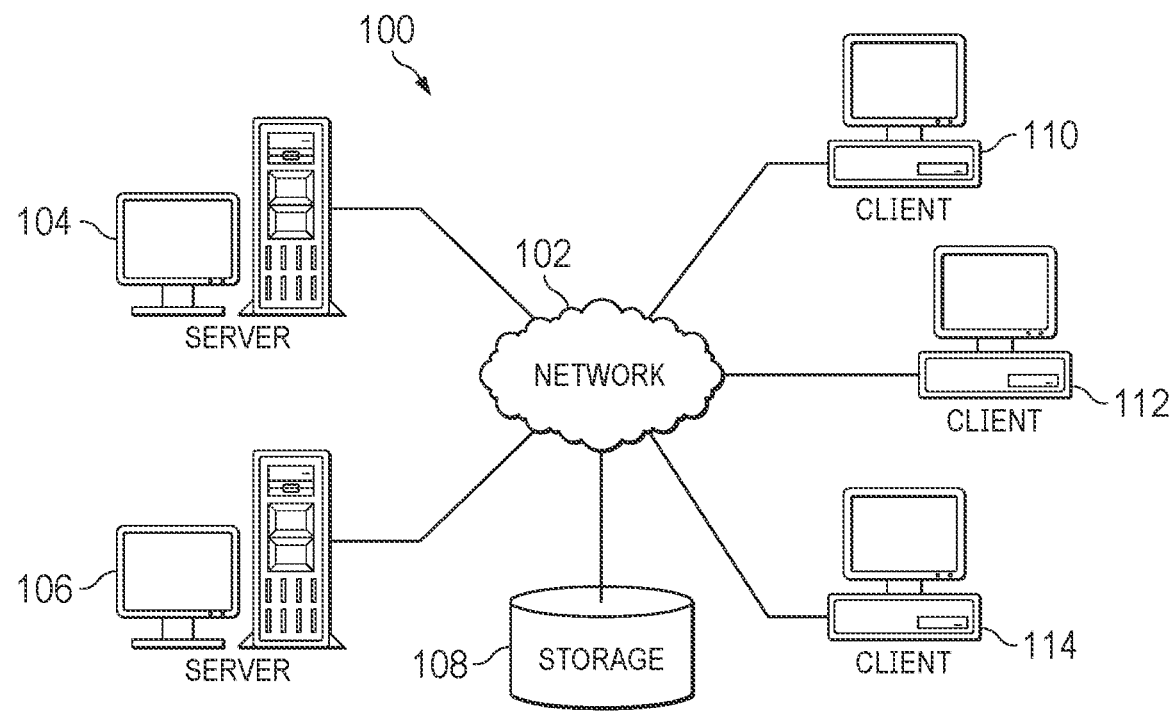
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second than a CPU, on the order of 100× or more. GPUs can be clustered together to run neural networks comprising hundreds of millions of connection nodes.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include, but are not limited to, regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include, but are not limited to, k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 2:
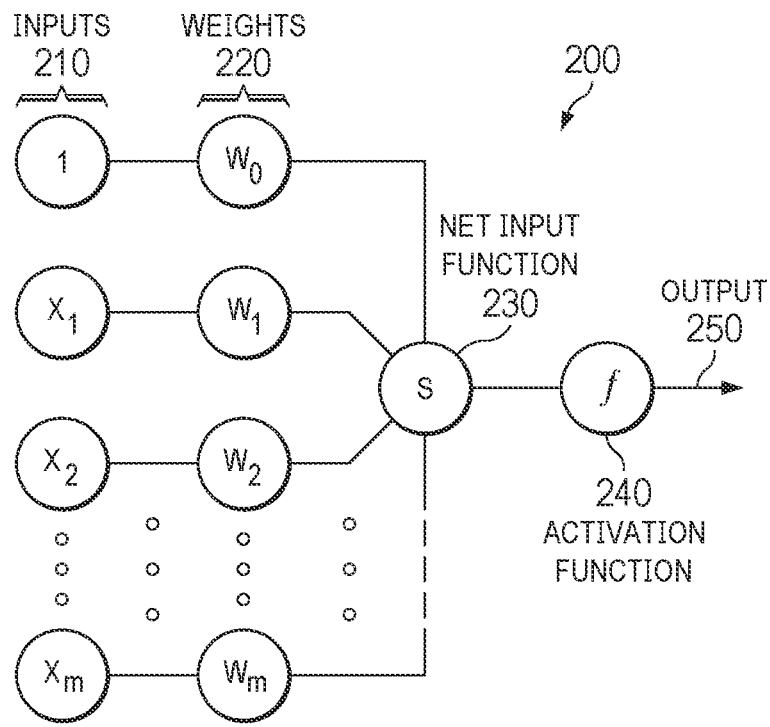
FIG. 2 is a diagram that illustrates a node in a neural network in which illustrative embodiments can be implemented.

FIG. 2 is a diagram that illustrates a node in a neural network in which illustrative embodiments can be implemented. Node 200 combines multiple inputs 210 from other nodes. Each input 210 is multiplied by a respective weight 220 that either amplifies or dampens that input, thereby assigning significance to each input for the task the algorithm is trying to learn. The weighted inputs are collected by a net input function 230 and then passed through an activation function 240 to determine the output 250. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 3:
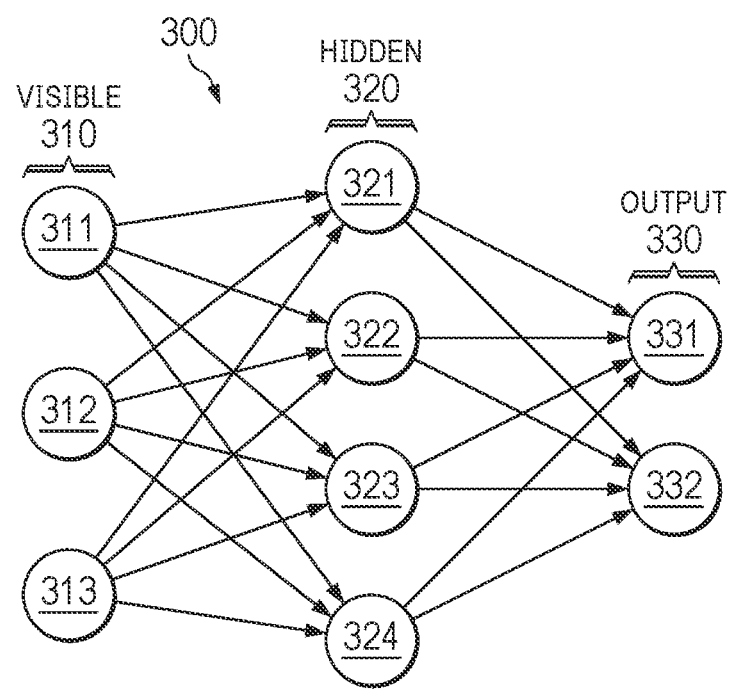
FIG. 3 is a diagram illustrating a restricted Boltzmann machine in which illustrative embodiments can be implemented.

FIG. 3 depicts a diagram illustrating a neural network in which illustrative embodiments can be implemented. As shown in FIG. 3, the nodes in the neural network 300 are divided into a layer of visible nodes 310, a layer of hidden nodes 320, and a layer of output nodes 330. The nodes in these layers might comprise nodes such as node 200 in FIG. 2. The visible nodes 310 are those that receive information from the environment (i.e., a set of external training data). Each visible node in layer 310 takes a low-level feature from an item in the dataset and passes it to the hidden nodes in the next layer 320. When a node in the hidden layer 320 receives an input value x from a visible node in layer 310 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 321 in hidden layer 320 receives input from all of the visible nodes 311, 312, and 313 in visible layer 310. Each input value x from the separate nodes 311-313 is multiplied by its respective weight, and all of the products are summed. The summed products are then added to the hidden layer bias, which is a constant value that is added to the weighted sum to shift the result of the activation function and thereby provide flexibility and prevent overfitting the dataset. The result is passed through the activation function to produce output to output nodes 331 and 332 in output layer 330. A similar process is repeated at hidden nodes 322, 323, and 324. In the case of a deeper neural network, the outputs of hidden layer 320 serve as inputs to the next hidden layer.

As mentioned above, neural networks can be stacked to created deep networks. After training one network, the activities of its hidden nodes can be used as training data for a higher-level network. Such stacking makes it possible to efficiently train several layers of hidden nodes. One such type of stacked network that more closely simulates the functioning of biological systems is a Spiking Neural Network (SNN). SNNs incorporate the concept of time into their operating model. One of the most important differences between SNNs and other types of neural networks is the way information propagates between units/nodes.

Whereas other types of neural networks communicate using continuous activation values, communication in SNNs is done by broadcasting trains of action potentials, known as spike trains. In biological systems, a spike is generated when the sum of changes in a neuron's membrane potential resulting from pre-synaptic stimulation crosses a threshold. This principle is simulated in artificial SNNs in the form of a signal accumulator that fires when a certain type of input surpasses a threshold. The intermittent occurrence of spikes gives SNNs the advantage of much lower energy consumption than other types of neural networks. A synapse can be either excitatory (i.e., increases membrane potential) or inhibitory (i.e., decreases membrane potential). The strength of the synapses (weights) can be changed as a result of learning.

Information in SNNs is conveyed by spike timing, including latencies and spike rates. SNNs allow learning (weight modification) that depends on the relative timing of spikes between pairs of directly connected nodes. Under the learning rule known as spike-timing-dependent plasticity (STDP) the weight connecting pre- and post-synaptic units is adjusted according to their relative spike times within a specified time interval. If a pre-synaptic unit fires before the post-synaptic unit within the specified time interval, the weight connecting them is increased (long-term potentiation (LTP)). If it fires after the post-synaptic unit within the time interval, the weight is decreased (long-term depression (LTD)).

The leaky integrate-and-fire (LIF) neuron has been a primary area of interest for the development of an artificial neuron and is a modified version of the original integrate-and-fire circuit. The LIF neuron is based on the biological neuron, which exhibits the following functionalities:

1) Integration: Accumulation of a series of input spikes,
2) Leaking: Leaking of the accumulated signal over time when no input is provided, and
3) Firing: Emission of an output spike when the accumulated signal reaches a certain level after a series of integration and leaking.

An LIF neuron continually integrates the energy provided by inputs until a threshold is reached and the neuron fires as a spike that provides input to other neurons via synapse connections. By emitting this spike, the neuron is returned to a low energy state and continues to integrate input current until its next firing. Throughout this process, the energy stored in the neuron continually leaks. If insufficient input is provided within a specified time frame, the neuron gradually reverts to a low energy state. This prevents the neuron from indefinitely retaining energy, which would not match the behavior of biological neurons.

Lateral inhibition is a process that allows an excited neuron to inhibit, or reduce, the activity of other nearby or connected neurons. One such neural computing system that seeks to take advantage of this is the winner-take-all system. As a form of competitive learning, artificial neurons contend for activation, meaning that only one neuron is chosen as the winner and allowed to fire, using lateral inhibition to suppress the output of all other neurons. After the winning neuron fires, the system is reset and the neurons once again compete for activation. A winner-take-all system is one of the many machine learning paradigms that take advantage of the lateral inhibition phenomenon, which is commonly used in recognition and modeling processes.

Figure 4:
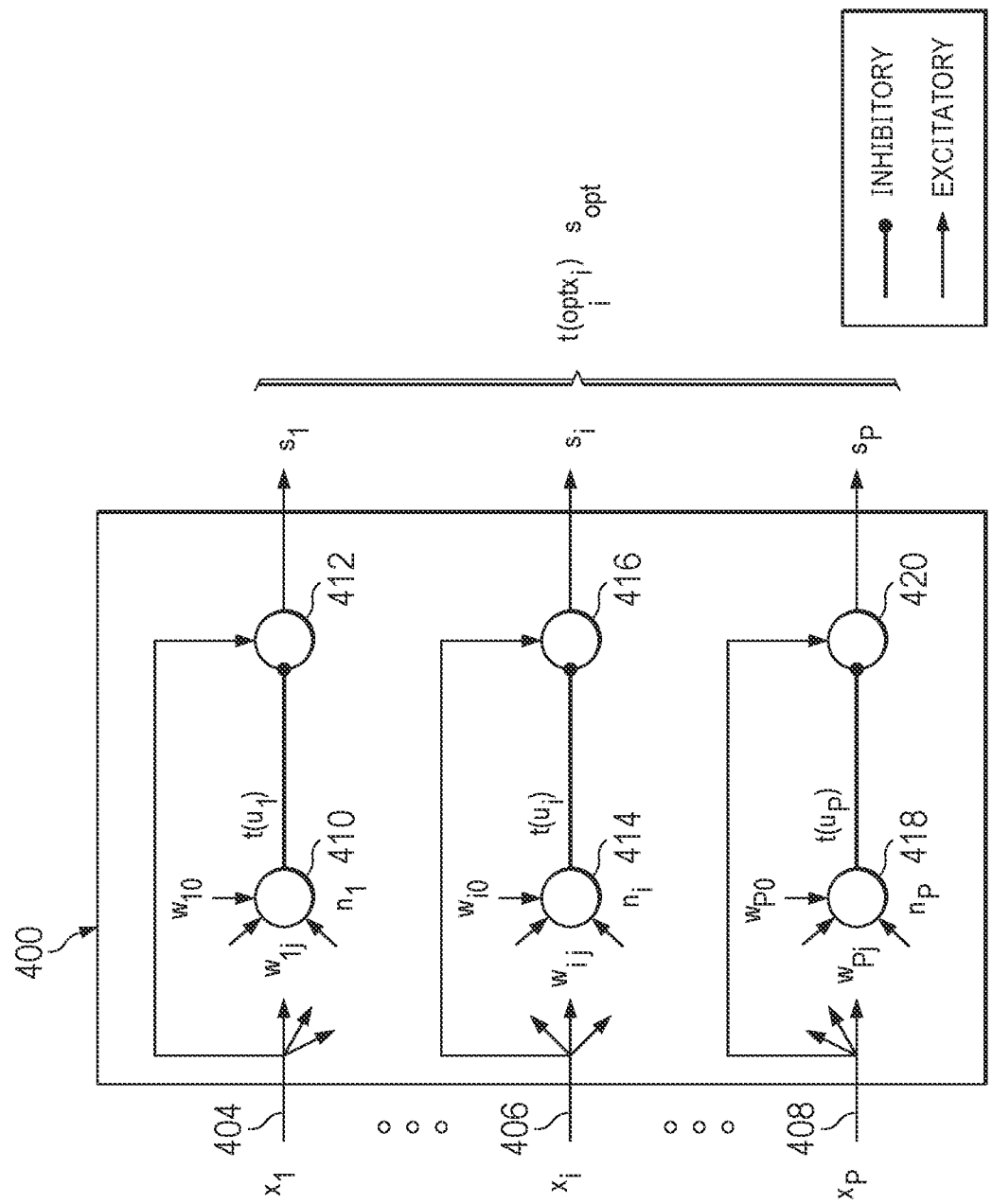
FIG. 4 is a schematic illustration of a spiking neural architecture, in accordance with an illustrative embodiment.

Turning to FIG. 4, a schematic illustration of a spiking neural architecture is depicted in accordance with an illustrative embodiment. Spiking neural architecture 400 may comprise a plurality of neuron lanes. A neuron lane is a particular type of excitatory neural pathway. For example, the number of neuron lanes might equal the number of input values from which an optimum value will be determined. In this example, input values $X_1$ through $X_p$ are provided to spiking neural architecture 400 comprises p neuron lanes.

Each neuron lane comprises a spiking neuron implementing an objective function and a blocking neuron. For example, neuron lane 404 comprises spiking neuron 410 and blocking neuron 412. Neuron lane 406 comprises spiking neuron 414 and blocking neuron 416. Neuron lane 408 comprises spiking neuron 418 and blocking neuron 420. Spiking neurons 410, 414, and 418 can be leaky integrate-and-fire neurons. Inputs to each spiking neuron might consist of any one or all of the external inputs $x_i$ modified by internal weights $w_{ij}$ and additional bias signal with weight $w_{i0}$.

In this particular application, spiking neurons 410, 414, and 418 in spiking neural architecture 400 might be initialized using the value of the un-normalized univariate signed rank function for each input value in relation to all other possible input values $\{x_1, x_2, \ldots, x_p\}$. The spiking neurons 410, 414, and 418 receive no further input. The first one of the spiking neurons to decay to zero defines the computed median value. In this way the initial neuron values can be either positive or negative according to un-normalized univariate signed rank function, and they will each decay toward zero as needed to compute the median. The spiking neurons thus provide inhibitory signals such that the first one to decay completely will be the first to no longer inhibit the output by its corresponding blocking neuron of its originally associated input signal $x_i$, corresponding to the sample median of the original array of input values.

In spiking neural architecture 400, each input $x_i$ is connected to each spiking neuron $n_j$, where the weights are set to $w_{ij}=\text{sign}(x_i-x_j)/x_j$. The bias weights $w_{i0}$ are set to 0 in this particular application. This architecture allows computation of the signed rank utility as $u_i=w_i x^T=\Sigma_{j=1}^{N} \text{sign}(x_i-x_j)$. Note that if multiple input values correspond to the same value as the sample median, then all of their associated spiking neurons will spike simultaneously. If a single spike is necessary downstream, other appropriate methods may be used to ensure that only a single spiking neuron is allowed to spike.

Figure 5:
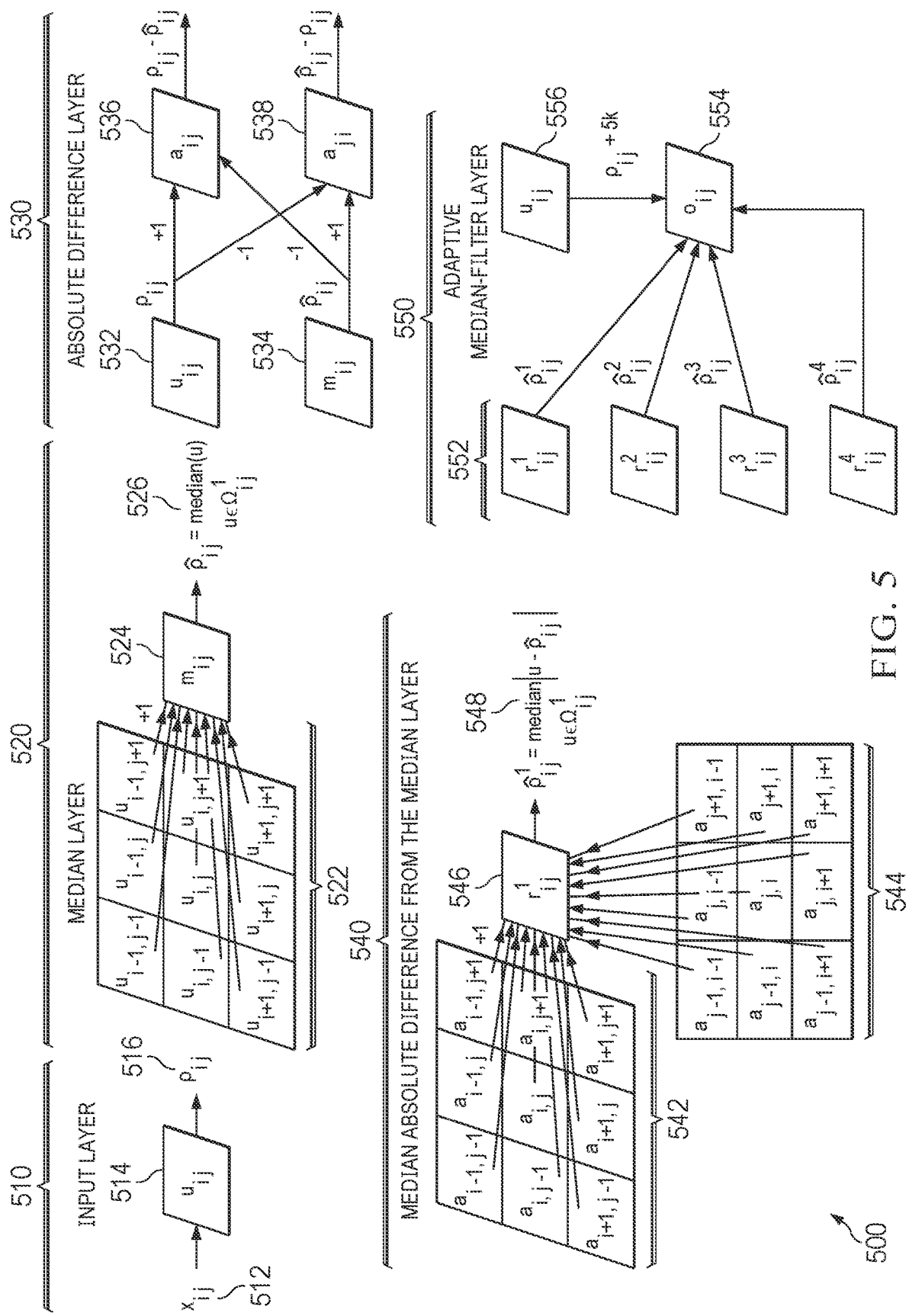
FIG. 5 depicts a multi-layer, spiking, adaptive median-filtering network in accordance with an illustrative embodiment.

FIG. 5 depicts a multi-layer, spiking, adaptive median-filtering (AMF) network in accordance with an illustrative embodiment. Spiking AMF network may be implemented in network data processing system 100 in FIG. 1. The example shown in FIG. 5 covers noise filtering in image processing. However, it should be noted that the method of the illustrative embodiments can be generalized to other types of datasets such as streaming data. Image processing and noise filtering are well suited to demonstrating anomaly detection because it is easy to visualize differences in performance.

In the example shown in FIG. 5, the spiking neurons in spiking AMF network 500 are LIF neurons which operated according to Equation 1 below:

$$u_j(t)=(u_j(t-1)-\lambda_j(u_j(t-1)-u^{eq}))(1-z_j(t-1))+u^{eq}z_j(t-1)+\Sigma_{i=0}^{P}w_{ij}x_i(t)+\Sigma_{q=1}^{P}\rho_q(z_q(t-1)) \quad \text{Eq. 1}$$

where $u_j$ is the potential for neuron j; $\lambda_j$ is the leakage rate; $u^{eq}$ is the equilibrium (or resting) potential; $z_j$ is 1 when neuron j fires (and 0 otherwise); $x_i$ are real valued inputs; $z_q$ are phase-coded spike inputs with a phase-code value of $\rho_q$ (from other phase-coded spiking neurons); and $w_{ij}$ are input weights.

In the present example, spiking AMF network 500 comprises five layers. Input layer 510 receives input value $x_{ij}$ 512 for data cell (e.g., pixel) $u_{ij}$ 514 and converts it to phase-coded spike value $\rho_{ij}$ 516. The phase-code for neuron j is computed according to Equation 2 below:

$$\rho_j(z_j(t)) = z_j(t)(t \bmod k) \qquad \text{Eq. 2}$$

The illustrative embodiments use phase-coding to represent spiking delay directly within a phase-coding window of length k (phase steps). Therefore, neuron j fires with a delay of $\rho_j/k = (t \bmod k)/k$. Phase-coding allows the spiking algorithm to process inputs and internal computations in ascending order. Including a delay of dk will delay the neuron firing by $\lfloor d/k \rfloor$ phase windows plus d mod k phase steps. The delay is assigned to an input according to its value within a minimum/maximum range. At each layer, the smallest phase-code is processed first, then proceeding up to the largest phase-code. The phase-coding is reset for each subsequent layer of the network.

The phase-coded spike $\rho_{ij}$ from the input layer 510 is fed into a median-value layer 520. Median-value layer 520 computes a median value for each data cell within neighborhood 522. A neighborhood comprises a number of input values surrounding a specific reference input value (in this case $u_{ij}$). In the example shown in FIG. 5, neighborhood 522 comprises a 3×3 matrix of data cells with data cell $u_{ij}$ at the center and eight immediately adjacent data cells. For each data cell within neighborhood 522, the median value layer 520 calculates a 3×3 median value. In the example shown in FIG. 5, median value $m_{ij}$ 524 is calculated for data cell $u_{ij}$ using all of the data cell values in neighborhood 522. The median value $m_{ij}$ 524 is represented by phase-coded spike $$\hat{\rho}_{ij} = \underset{u \in \Omega_{ij}^1}{\text{median}}(u) 526.$$

To calculate the 3×3 median value for the other data cells in neighborhood 522, the median value layer 520 uses values for data cells that are in neighborhood 522 as well as data cells that are not included in neighborhood 522. For example, to calculate the median value for data cell $u_{i,j-1}$ the median value layer will use the values of data cells $u_{i-1,j-1}$, $u_{i-1,j}$, $u_{i,j}$, $u_{i+1,j-1}$, as well as unshown data cells $u_{i,j-2}$, $u_{i+1,j-2}$, and $u_{i-1,j-2}$.

All data cells in neighborhood 522 are processed in parallel. However, the median value layer 520 only has to wait for half of the neurons representing the data cells in neighborhood 522 to spike before forwarding the spikes to the next layer.

For simplicity of illustration, FIG. 5 only depicts a 3×3 neighborhood 522 containing data cell $u_{ij}$ corresponding to $\Omega_{ij}^1$ & $r_{ij}^1$. In an embodiment, median value layer 520 also calculates in parallel a median value for data cell $u_{ij}$ for a number of progressively larger neighborhoods containing $u_{ij}$. These neighborhoods can include, e.g., matrices of size 5×5 (corresponding to $\Omega_{ij}^2$ & $r_{ij}^2$), 7×7 (corresponding to $\Omega_{ij}^3$ & $r_{ij}^3$), and 9×9 (corresponding to $\Omega_{ij}^4$ & $r_{ij}^4$).

In the case of a data stream (e.g., sequential, time-series), a neighborhood can comprise a specified number of input values before and after a reference input or input values within a specified time frame before and after the reference input. A hierarchy of larger neighborhoods around the reference input would comprises progressively larger numbers of preceding and trailing inputs rather than larger matrices. This hierarchical arrangement of anomaly detection is even more important when handling streaming data (e.g., in detecting CRISPR edits, finding a single anomalous nucleotide position is not as significant as finding multiple of these in larger neighborhood sizes, especially when near a potential target site).

The surrounding data can come from any "idea" of a neighborhood, i.e., it can be based upon spatial placement or based upon sequential or temporal relationships. As explained above, a neighborhood may comprise the values before and after the reference one. The neighborhood may also be based upon sequence or temporal information. For example, in a paragraph of text, the last (summation) sentence relates to those sentences that come before it, and it might also be related (and important) to text in the next paragraph. Similarly, the gene sequences in DNA are coded semi-contiguously, and during protein translation these sub-sequences are connected using special DNA markers for the beginning (start codons) and ending (stop codons) of each sub-sequence. Events in time, such as those encountered in cybersecurity or video, are related through causality, i.e., one event will occur before another and participate in causing the latter event and/or both will be causally related to following events.

After the median value for a data cell is calculated by the median value layer 520, an absolute difference layer 530 calculates the absolute difference between the median value $m_{ij}$ 534 and the original value for the data cell $u_{ij}$ 532 using a 2×2 comparison. In one comparison, neuron $a_{ji}$ 538 subtracts the value of the phase-coded spike $\rho_{ij}$ for the original input $u_{ij}$ from the value of the phase-coded spike $\hat{\rho}_{ij}$ for the median value $m_{ij}$. Neuron $a_{ij}$ 536 subtracts $\hat{\rho}_{ij}$ from $\rho_{ij}$. Only one of either $a_{ij}$ or $a_{ji}$ can have a positive input and therefore spike. The other neuron will have a negative input and therefore not spike. Alternatively, both signals can be zero if there is no difference between median value and original input value.

The absolute value indicates the degree to which the original input value of data cell $u_{ij}$ differs from the other data cells in the neighborhood.

An absolute difference is calculated in parallel for each data cell, for each specified size neighborhood. Therefore, for example, an absolute difference is calculated for data cell $u_{ij}$ using the 3×3 median value (shown in FIG. 5), 5×5 median value, 7×7 median value, and 9×9 median value.

The positive value calculated by absolute difference layer 530 is propagated to the median absolute difference (or deviation) (MAD) layer 540, which calculates a MAD value $r_{ij}^1$ 546 for data cell $u_{ij}$. The MAD layer 540 can potentially receive signals from one of two sets of spiking neurons from absolute difference layer 530, set 542 (centered around neuron $a_{ij}$) or set 544 (centered around neuron $a_{ji}$). However, as noted above regarding absolute difference, only one of the paired signals from $a_{ij}$ and $a_{ji}$ can be positive (and propagated forward to MAD layer 540) since the other is guaranteed to be negative, or both can be zero.

MAD layer 540 operates in a similar manner to median layer 520, but instead of calculating the median of the original data cell values, MAD layer 540 calculates the median of the absolute difference values calculated in layer 530. The MAD value $r_{ij}^1$ 546 is represented by phase-coded spike $$\hat{\rho}_{ij}^1 = \underset{u \in \Omega_{ij}^1}{\text{median}} |u - \hat{\rho}_{ij}| 548.$$

In an embodiment, for each data cell, MAD layer 540 calculates a MAD value for the data cell for a number of different size neighborhoods (i.e., 3×3, 5×5, etc.), similar to median layer 520. The MAD value of the data cell for each size neighborhood is then propagated to an adaptive median-filter (AMF) layer 550.

The AMF layer 550 compares the MAD values of a data cell, represented by a number of spiking neurons $r^m$ 552 for each size neighborhood (i.e., $r_{ij}^1$, $r_{ij}^2$, $r_{ij}^3$, $r_{ij}^4$) to predefined threshold values $\theta^m$ according to Equation 3 below:

$$o_{ij} = \begin{cases} \hat{\rho}_{ij}^1, & \exists\, m, \hat{\rho}_{ij}^m > \theta^m \\ x_{ij}, & \text{otherwise} \end{cases} \quad \text{Eq. 3}$$

where, $$\hat{\rho}_{ij}^m = \underset{x \in \Omega_{ij}^m}{\text{median}}\{x\}$$

$$\Omega_{ij}^m = \{x_{lr} | i-m \le l \le i+m,\, j-m \le r \le j+m\}$$

$$\theta^m = s \cdot \underset{x \in \Omega_{ij}^m}{\text{median}}\{\hat{\rho}_{ij}^m - x\} + \delta^m$$

$$\delta^m = \frac{((2m+1)^2 - 1)}{2}$$

Stated more simply, if the MAD value of a data cell for a neighborhood m exceeds its predefined threshold $\theta^m$, the data cell is deemed to deviate too far from its neighbors, and an anomaly is detected, causing the representative neuron $r^m$ for that neighborhood to spike. If an anomaly is detected in any size neighborhood, the median value of the data cell for the smallest neighborhood, represented by phase-coded spike $\hat{\rho}_{ij}^1$, is output by the AMF layer 550 as output $o_{ij}$ 554 instead of the data cell's original input value $x_{ij}$. If more than one size neighborhood spikes, the median value for the smallest neighborhood ($\hat{\rho}_{ij}^1$) is still selected as the output value $o_{ij}$ 554. The median value for the smallest neighborhood is deemed to be the most accurate representation of the immediate surroundings of the data cell in question.

If none of the neurons 552 spike, no anomaly is detected for the data cell in any of the neighborhoods, and the original value $x_{ij}$ of the data cell $u_{ij}$ 556 is output as $o_{ij}$ 554.

In the present example, the phase-coded but unprocessed data cell value $u_{ij}$ is delayed by 5k phase-code windows to allow the appropriate time for anomaly detection in each of the neighborhoods.

Multiple iterations of spiking adaptive median filtering are handled by routing the outputs $o_{ij}$ from the AMF layer 550 back into the median layer 520, bypassing the input layer 510 and continuing forward to the outputs again.

The anomaly detection method described above can be generalized and applied to sequence-based anomaly detection. Whereas the anomaly detection described above is specific to two-dimensional images, the approach can be generalized to multiple dimensions, one or more of which might be time-series data.

The multi-dimensional anomaly detection framework generalizes upon the spiking AMF algorithm. This new framework also uses deep spiking neural networks with phase-coded activation and communication. Multi-dimensional anomaly detection requires several parameters specified by the user. First, the dimension of the data, d, is provided. Second, the hierarchical breadth, $m^{ij}$, across each dimension (specified using the d-dimensional index vector, $j=[j_1, j_2, \ldots, j_d]$) and level of hierarchy (i) is also provided. This parameter defines a window within which to search for anomalies with respect to the dimension and breath in the hierarchy. Third, a scale factor (s) is used in weighting the significance of the median absolute difference from the median. The mathematical description of the multi-dimensional anomaly detection algorithm is:

$$o_j = \begin{cases} \text{anomaly}, & \exists\, M^{ij}, \hat{\rho}_j^{m^{ij}} > \theta^{m^{ij}} \\ \text{normal}, & \text{otherwise} \end{cases} \quad \text{Eq. 4}$$

where, $$\hat{\rho}_j^{m^{ij}} = \underset{x \in \Omega_j^{m^{ij}}}{\text{median}}\{x\}$$

$$\Omega_j^{m^{ij}} = \{x_j | j_1 - m^{ij_1} \le j_1 \le j_1 + m^{ij_1}, \wedge \ldots \wedge j_d - m^{ij_d} \le j_d \le j_d + m^{ij_d}\}$$

$$\theta^{m^{ij}} = s \cdot \underset{x \in \Omega_j^{m^{ij}}}{\text{median}}\{\hat{\rho}_j^{m^{ij}} - x\} + \delta^{m^{ij}}$$

$$\delta^{m^{ij}} = \frac{[\Pi_{k=1}^d (2m^{ijk} + 1)] - 1}{2}$$

The multi-dimensional anomaly detection framework can be reduced to the spiking AMF algorithm described above, where d=2. It should be noted that the spiking AMF algorithm was designed to find and remove anomalies in two dimensions simultaneously instead of just detecting them. Therefore, the output value ($o_j$) uses the lowest level of hierarchy (i.e., i−1) median value when an anomaly is detected and the original data value otherwise. Additionally, the parameterization for $m^{ij}$ would be the same across all data dimensions. Therefore, the index for the data dimension (j) would be dropped and only $m^i$ used, i.e., $m^{ij_1} = m^{ij_2} = \ldots = m^{ij_d} = m^i$.

In spiking AMF, four levels of hierarchy were used. Therefore, $m^1=1$, $m^2=2$, $m^3=3$, $m^4=4$. According to this parameterization, the spiking AMF algorithm is achieved as follows:

$$o_{j_1 j_2} = \begin{cases} \hat{\rho}_{j_1 j_2}^{m^1}, & \exists\, m^i, \hat{\rho}_{j_1 j_2}^{m^i} > \theta^{m^i} \\ x_{j_1 j_2}, & \text{otherwise} \end{cases} \quad \text{Eq. 5}$$

where, $$\hat{\rho}_{j_1 j_2}^{m^1} = \underset{x \in \Omega_{j_1 j_2}^{m^i}}{\text{median}}\{x\}$$

$$\Omega_{j_1 j_2}^{m^1} = \{x_{lr} | j_1 - m^i \le l \le j_1 + m^i,\, j_2 - m^i \le r \le j_2 + m^i\}$$

$$\theta^{m^i} = s \cdot \underset{x \in \Omega_{j_1 j_2}^{m^i}}{\text{median}}\{\hat{\rho}_{j_1 j_2}^{m^i} - x\} + \delta^{m^i}$$

$$\delta^{m^i} = \frac{((2m^i + 1)^2 - 1)}{2}$$

Figure 6:
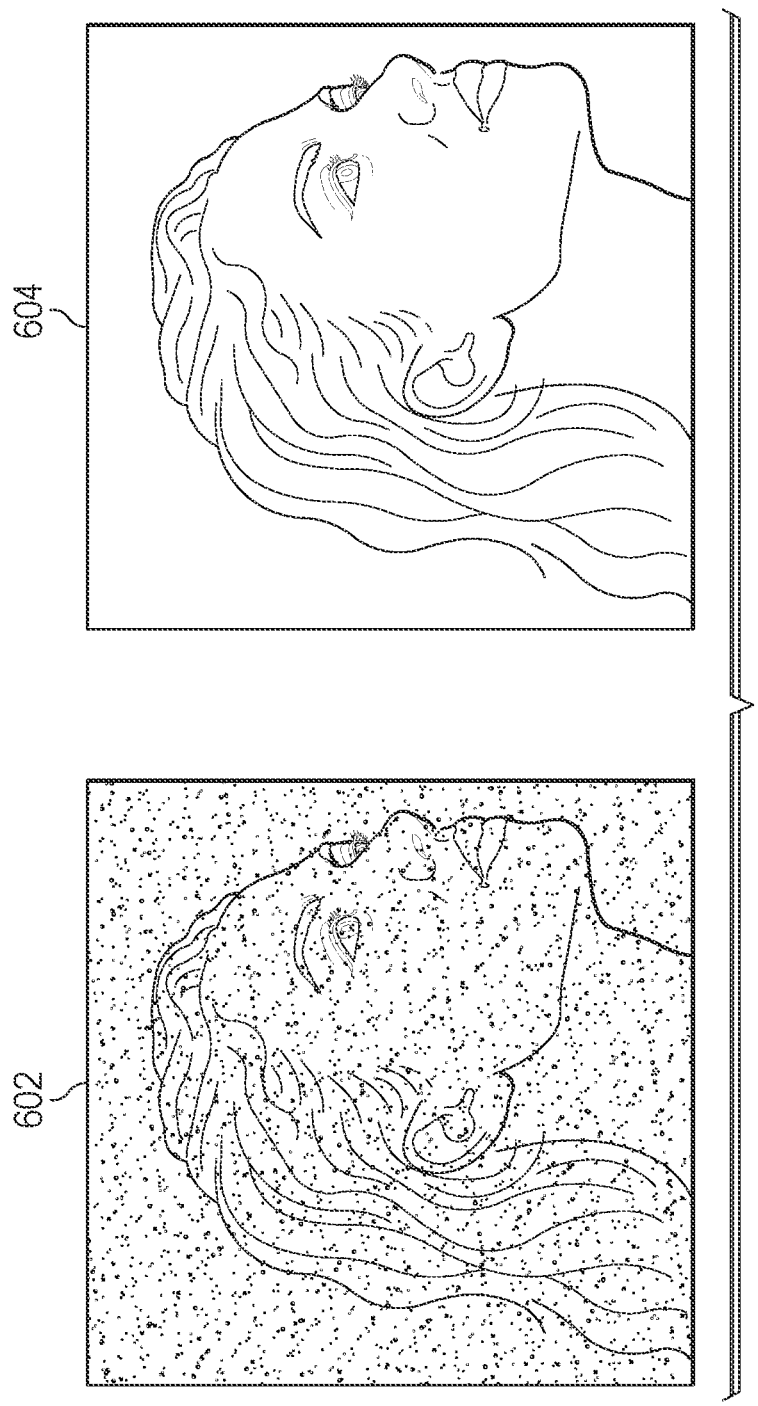
FIG. 6 depicts the application of anomaly detection and correction using a spiking neural network in accordance with illustrative embodiments.

FIG. 6 depicts the application of anomaly detection and correction using a spiking neural network in accordance with illustrative embodiments. Image 602 is the original unprocessed image containing 10% "salt-and-pepper" noise. Image 604 is the corrected image after passing the original image 602 through the AMF spiking network. Spiking AMF results in a percentage of changed (corrected) pixels after three iterations that equals the percentage of noise in the original image 602.

Both DNA (deoxyribonucleic acid) and RNA (ribonucleic acid) data are sequential in nature and therefore can be reduced to a single dimension (i.e., $j=|j_1|$ only) by ignoring the complement diploid sequence (i.e., only forward or reverse sequences are used, not both simultaneously). This use case also serves to represent other single dimension time-series or sequential data situations.

In this use case, longer windows of the data are needed to detect anomalies of interest across greater sequence or time-series values. Therefore, $m^i=2^i$ for $i\in\{1,2,3,4\}$ are used. The equations can be simplified by using index variable j instead of multi-dimensional index vector j.

$$o_j = \begin{cases} \text{anomaly}, & \exists\, m^i, \hat{\rho}_j^{m^i} > \theta^{m^i} \\ \text{normal}, & \text{otherwise} \end{cases} \quad \text{Eq. 6}$$

where, $$\hat{\rho}_j^{m^i} = \underset{x\in\Omega_j^{m^i}}{\text{median}}\{x\}$$

$$\Omega_j^{m^i} = \{x_{lr} | j-m^i \leq j \leq j+m^i\}$$

$$\theta^{m^i} = s \cdot \underset{x\in\Omega_j^{m^i}}{\text{median}}\{\hat{\rho}_j^{m^i} - x\} + \delta^{m^i}$$

$$\delta^{m^i} = m^i$$

CRISPR-Cas9 (Clustered Regularly Interspaced Short Palindromic Repeats-CRISPR-associated protein 9) editing is a technique that edits genes by cutting DNA and then letting naturally occurring DNA repair processes to operate. The CRISP-Cas9 technique uses a single guide RNA (sgRNA) to attach to a specific sequence in the DNA along with an enzyme that performs a double-strand cut (or edit) in the DNA during the cell replication process. Two major results may occur as the cell attempts to fix the edit. In non-homologous end-joining (NHEJ), the replication can perfectly rejoin the cut DNA strand, or a small amount of DNA can be deleted or inserted into the break when it is rejoined. The second process is homology-driven repair (HDR), wherein a specifically targeted strand of DNA is provided for insertion into the break while cut DNA is being repaired. The results discussed below are for NHEJ edit detection.

Figure 7:
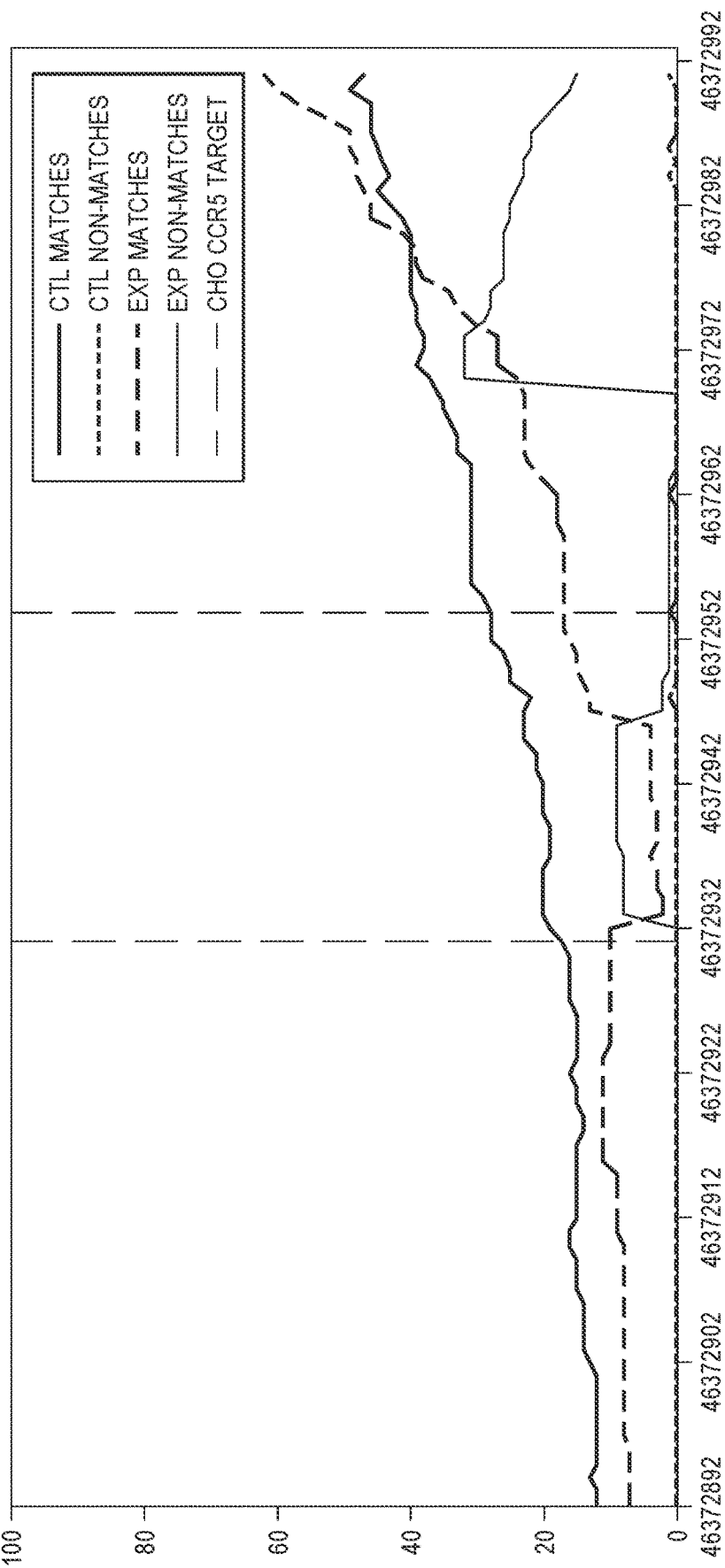
FIG. 7 depicts a graph visualizing an example of a CRISPR-Cas9 edit in accordance with an illustrative embodiment.

FIG. 7 depicts a graph visualizing an example of a CRISPR-Cas9 edit in accordance with an illustrative embodiment. FIG. 7 visualizes the CCR5 region in chromosome 3 where CRISPR-Cas9 editing was conducted in the experiment dataset (EXP) but not in the control dataset (CTL), wherein the dashed lines span the sgRNA used during the experiment. The visualization in FIG. 7 is produced by the processing of a DNA sequence read pipeline specifically designed to highlight insertions, deletions, mismatches and (hard and soft) clips in deep sequenced DNA reads. The example shown in FIG. 7 shows the targeted edit region at the CCR5 gene in chromosome 3 using a 23-mer sgRNA. Thus, the edit region, bounded by the dashed lines, spans 23 nucleotides in the region of CCR5.

Figure 8:
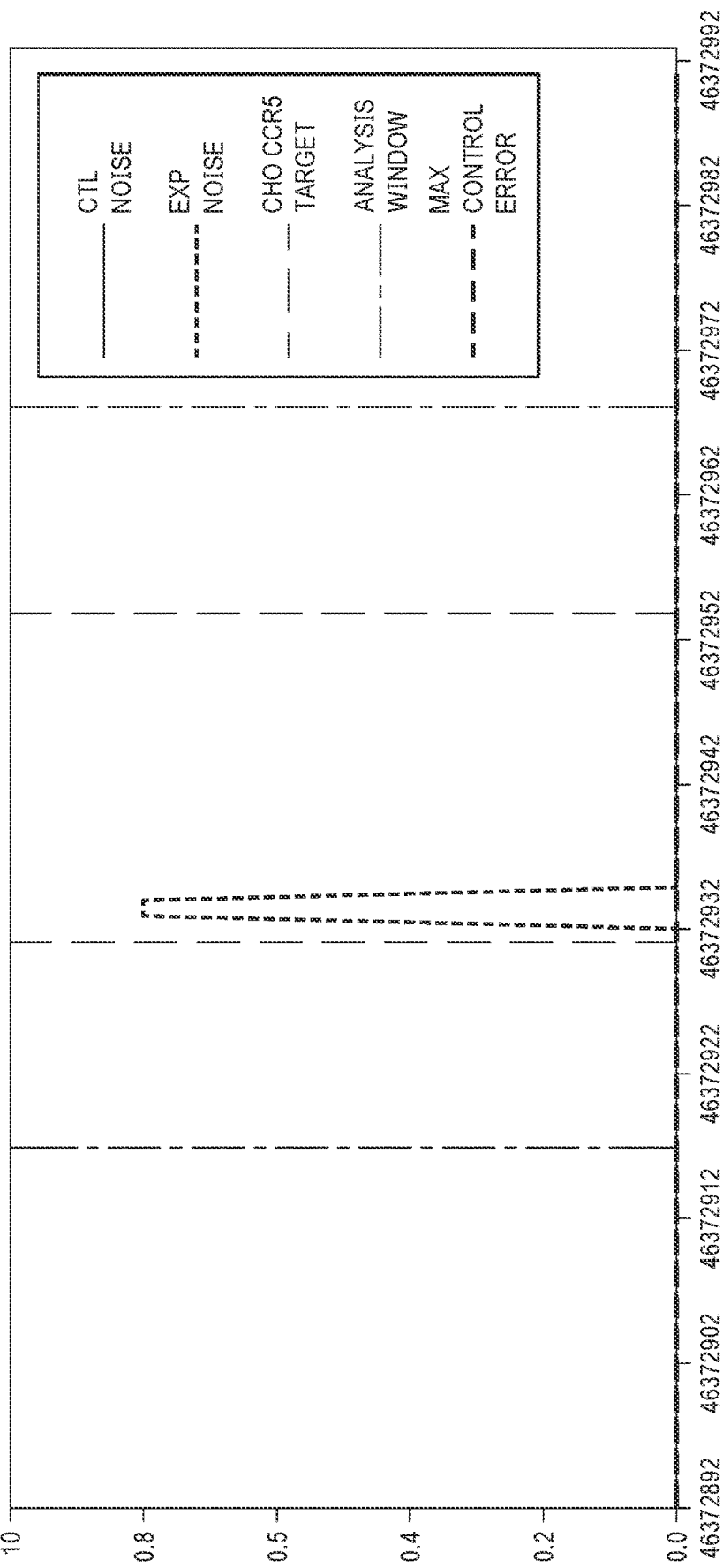
FIG. 8 depicts a graph illustrating a demonstration of sequence-based anomaly detection in accordance with an illustrative embodiment.

FIG. 8 depicts a graph illustrating a demonstration of sequence-based anomaly detection in accordance with an illustrative embodiment. FIG. 8 shows the exact same region at the CCR5 edit site in chromosome 3 as FIG. 7. The anomaly detection results are normalized between 0 and 1. The left end of the edit region is detected as anomalous in the experiment dataset (EXP) but not in the control dataset (CTL). The vertical axis displays the confidence value of the edit detection. It should be noted that the normalized anomaly detection values for the CTL dataset are all 0.

Figure 9:
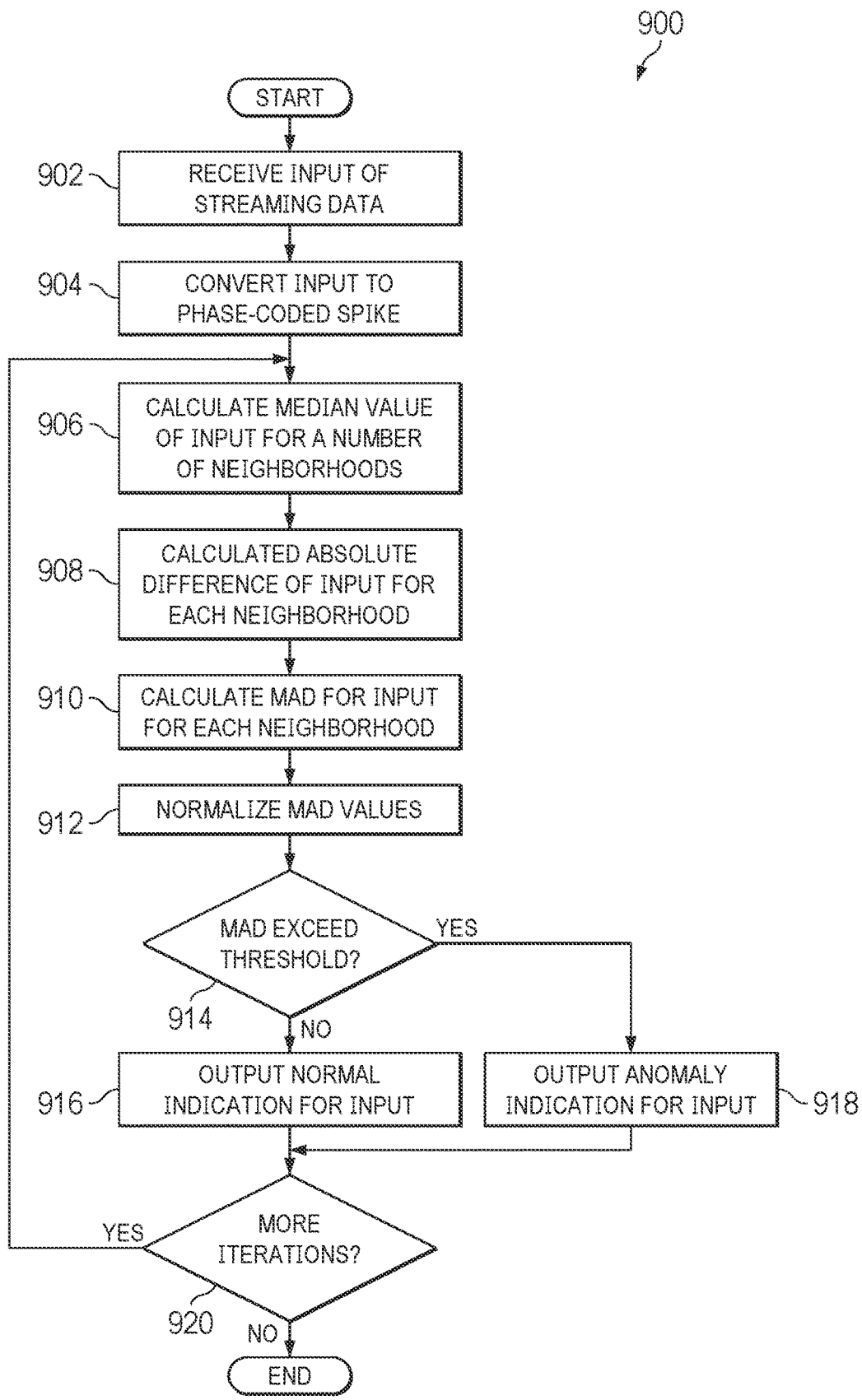
FIG. 9 is a flowchart depicting a method of anomaly detection for streaming data in accordance with illustrative embodiments.

FIG. 9 depicts a flowchart illustrating a method of anomaly detection for streaming data in accordance with illustrative embodiments. Process in 900 can be implemented in hardware, software, or both. When implemented in software, the process can take the form of program code that is run by one of more processor units located in one or more hardware devices in one or more computer systems. For example, the process can be implemented in a neural network such as network neural network 300 in FIG. 3, spiking neural architecture 400 in FIG. 4, and a spiking AMF network similar to network 500 in FIG. 5 but modified for one dimensional sequential data rather than two dimensional images.

Process 900 begins by receiving inputs of streaming data, wherein each input is contained within a number of neighborhoods, wherein the neighborhoods comprise a number of increasingly larger symmetrical numbers of inputs preceding and following the input (step 902). The streaming data may comprise sequential data or time-series data. For example, the input might be a DNA sequence or other stream of sequential data. The inputs are then converted to a phase-coded spike value (step 904).

From the phase-coded spikes, the system computes a median value of each input for each size neighborhood containing the input (step 906). After the median value of the input is calculated, an absolute difference of each input is calculated from its median value for each size neighborhood containing the input (step 908).

From the absolute differences, a median absolute difference (MAD) value of each input is calculated for each size neighborhood containing the input (step 910). The system may normalize the MAD values (step 912).

For each input the system determines whether the MAD value for any size neighborhood containing the input exceeds a respective threshold (step 914). Responsive to a determination that the MAD value of one or more neighborhoods exceeds its threshold, the system outputs an anomaly indication for the input (step 918). Detection of an anomaly may indicate, e.g., a DNA edit.

Responsive to a determination that none of the MAD values for the neighborhoods exceeds its threshold, the system outputs a normal indication for the input (step 916).

After the output value has been selected, process 900 determines if a predetermined number of iterations have been performed on the input data (step 920). If the prescribed number of iterations has not yet been performed, the determination of whether the MAD value for any size neighborhood exceeds a respective threshold is routed back as input for computing the median value of each input for each neighborhood at step 906. If the prescribed number of iterations has been performed, process 900 ends.

Figure 10:
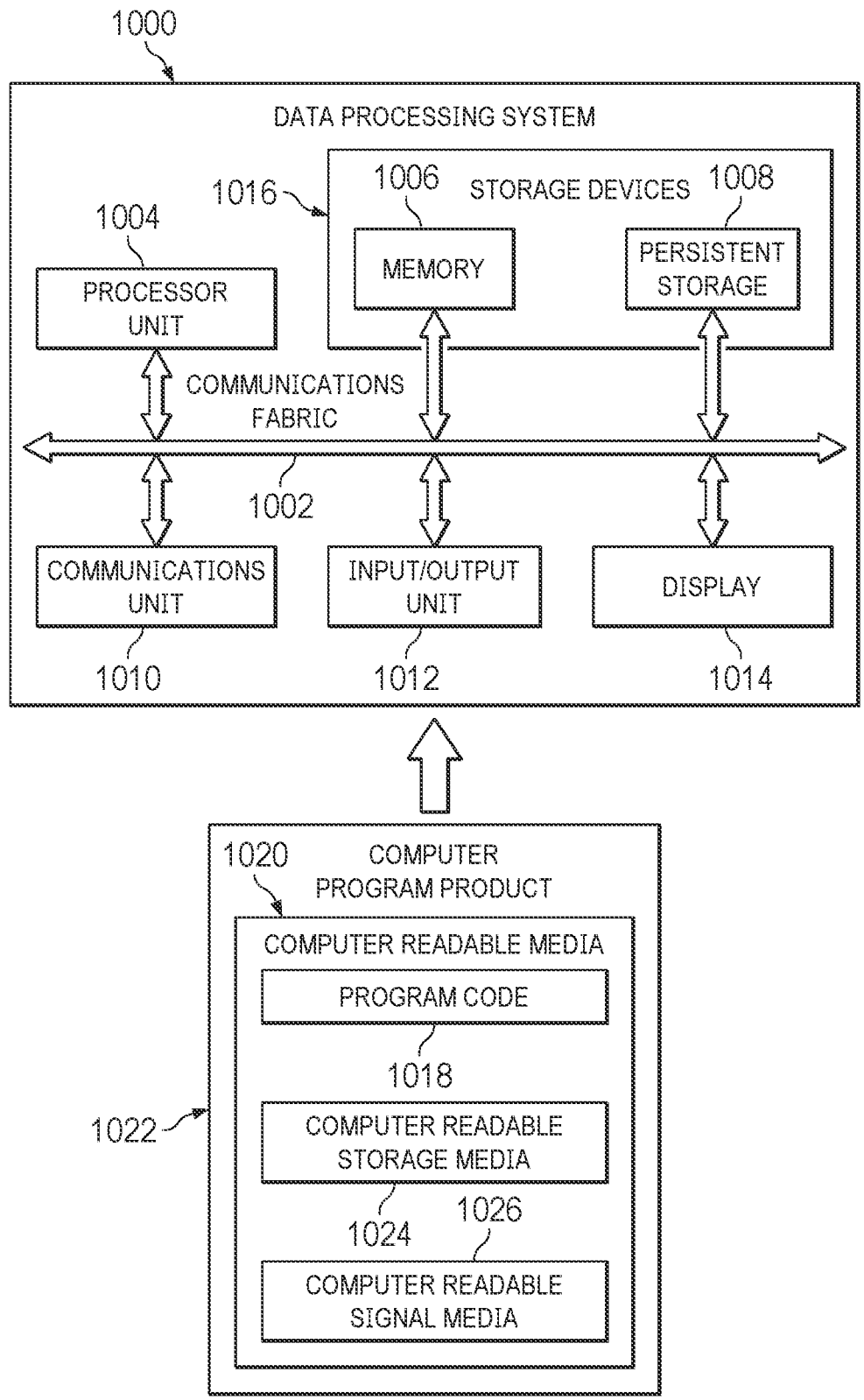
FIG. 10 is a diagram of a data processing system depicted in accordance with an illustrative embodiment.

Turning to FIG. 10, a diagram of a data processing system is depicted in accordance with an illustrative embodiment. Data processing system 1000 may be used to implement servers 104 and 106 and clients 110, 112, 114 in Network data processing system 100 in FIG. 1 and spiking AMF network 500 in FIG. 5. Data processing system 1000 is an example of a system in which computer-readable program code or program instructions implementing processes of illustrative embodiments may be run. In this illustrative example, data processing system 1000 includes communications fabric 1002, which provides communications between processor unit 1004, memory 1006, persistent storage 1008, communications unit 1010, input/output unit 1012, and display 1014.

Processor unit 1004 serves to execute instructions for software applications and programs that may be loaded into memory 1006. Processor unit 1004 may be a set of one or more hardware processor devices or may be a multi-processor core, depending on the particular implementation. Further, processor unit 1004 may be implemented using one or more heterogeneous processor systems, in which a main processor is present with secondary processors on a single chip. As another illustrative example, processor unit 1004 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 1006, in these examples, may be, for example, a random access memory, or any other suitable volatile or non-volatile storage device. Persistent storage 1008 may take various forms, depending on the particular implementation. For example, persistent storage 1008 may contain one or more devices. For example, persistent storage 1008 may be a hard drive, a flash memory, a rewritable optical disk, a rewritable magnetic tape, or some combination of the above. The media used by persistent storage 1008 may be removable. For example, a removable hard drive may be used for persistent storage 1008.

Communications unit 1010, in this example, provides for communication with other computers, data processing systems, and devices via network communications unit 1010 may provide communications using both physical and wireless communications links. The physical communications link may utilize, for example, a wire, cable, universal serial bus, or any other physical technology to establish a physical communications link for data processing system 1000. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 1000.

Input/output unit 1012 allows for the input and output of data with other devices that may be connected to data processing system 1000. For example, input/output unit 1012 may provide a connection for user input through a keypad, keyboard, and/or some other suitable input device. Display 1014 provides a mechanism to display information to a user and may include touch screen capabilities to allow the user to make on-screen selections through user interfaces or input data, for example.

Instructions for the operating system, applications, and/or programs may be located in storage devices 1016, which are in communication with processor unit 1004 through communications fabric 1002. In this illustrative example, the instructions are in a functional form on persistent storage 1008. These instructions may be loaded into memory 1006 for running by processor unit 1004. The processes of the different embodiments may be performed by processor unit 1004 using computer-implemented program instructions, which may be located in a memory, such as memory 1006. These program instructions are referred to as program code, computer-usable program code, or computer-readable program code that may be read and run by a processor in processor unit 1004. The program code, in the different embodiments, may be embodied on different physical computer-readable storage devices, such as memory 1006 or persistent storage 1008.

Program code 1018 is located in a functional form on computer-readable media 1020 that is selectively removable and may be loaded onto or transferred to data processing system 1000 for running by processor unit 1004. Program code 1018 and computer-readable media 1020 form computer program product 1022. In one example, computer-readable media 1020 may be computer-readable storage media 1024 or computer-readable signal media 1026. Computer-readable storage media 1024 may include, for example, an optical or magnetic disc that is inserted or placed into a drive or other device that is part of persistent storage 1008 for transfer onto a storage device, such as a hard drive, that is part of persistent storage 1008. Computer-readable storage media 1024 also may take the form of a persistent storage, such as a hard drive, a thumb drive, or a flash memory that is connected to data processing system 1000. In some instances, computer-readable storage media 1024 may not be removable from data processing system 1000.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 1018 may be downloaded over a network to persistent storage 1008 from another device or data processing system through computer-readable signal media 1026 for use within data processing system 1000. For instance, program code stored in a computer-readable storage media in a data processing system may be downloaded over a network from the data processing system to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to, or in place of, those illustrated for data processing system 1000. Other components shown in FIG. 10 can be varied from the illustrative examples shown. The different embodiments may be implemented using any hardware device or system capable of executing program code. As one example, data processing system 1000 may include organic components integrated with inorganic components and/or may be comprised entirely of organic components excluding a human being. For example, a storage device may be comprised of an organic semiconductor.

As another example, a computer-readable storage device in data processing system 1000 is any hardware apparatus that may store data. Memory 1006, persistent storage 1008, and computer-readable storage media 1024 are examples of physical storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006 or a cache such as found in an interface and memory controller hub that may be present in communications fabric 1002.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of anomaly detection for streaming data, the method comprising:

using a number of processors to implement a spiking neural network that performs the steps of:
receiving inputs of streaming data, wherein each input is contained within a number of neighborhoods, wherein the neighborhoods comprise a number of increasingly larger symmetrical numbers of inputs preceding and following the input;
converting the inputs into phase-coded spikes;
calculating, from the phase-coded spikes, a median value of each input for each size neighborhood containing the input;
calculating an absolute difference of each input from its median value for each size neighborhood containing the input;
calculating, from the absolute differences, a median absolute difference (MAD) value of each input for each size neighborhood containing the input;
determining for each input whether the MAD value for any size neighborhood containing the input exceeds a respective threshold, wherein;
responsive to a determination that the MAD value of one or more neighborhoods exceeds its threshold, outputting an anomaly indication for the input; and
responsive to a determination that none of the MAD values for the neighborhoods exceeds its threshold, outputting a normal indication for the input.

2. The method of claim 1, further comprising normalizing the MAD values.

3. The method of claim 1, further comprising routing the determination of whether the MAD value for any size neighborhood exceeds a respective threshold back as input for computing the median value of each input for each neighborhood.

4. The method of claim 1, wherein phase-coding represents a neuron spiking delay for a specified length of time to allow processing the inputs in ascending order.

5. The method of claim 1, wherein the streaming data comprises one of:
sequential data; or
time-series data.

6. The method of claim 1, wherein the inputs comprise a DNA sequence.

7. The method of claim 6, wherein detection of an anomaly indicates a DNA edit.

8. The method of claim 1, wherein the spiking neural network comprises leaky integrate-and-fire neurons.

9. A system for anomaly detection for streaming data, the system comprising:
a storage device configured to store program instructions; and
one or more processors operably connected to the storage device and configured to execute the program instructions to implement a spiking neural network that causes the system to:
receive inputs of streaming data, wherein each input is contained within a number of neighborhoods, wherein the neighborhoods comprise a number of increasingly larger symmetrical numbers of inputs preceding and following the input;
convert the inputs into phase-coded spikes;
calculate, from the phase-coded spikes, a median value of each input for each size neighborhood containing the input;
calculate an absolute difference of each input from its median value for each size neighborhood containing the input;
calculate, from the absolute differences, a median absolute difference (MAD) value of each input for each size neighborhood containing the input;
determine for each input whether the MAD value for any size neighborhood containing the input exceeds a respective threshold, wherein;
responsive to a determination that the MAD value of one or more neighborhoods exceeds its threshold, output an anomaly indication for the input; and
responsive to a determination that none of the MAD values for the neighborhoods exceeds its threshold, output a normal indication for the input.

10. The system of claim 9, wherein the spiking neural network normalizes the MAD values.

11. The system of claim 9, wherein the spiking neural network further routes the determination of whether the MAD value for any size neighborhood exceeds a respective threshold back as input for computing the median value of each input for each neighborhood.

12. The system of claim 9, wherein phase-coding represents a neuron spiking delay for a specified length of time to allow processing the inputs in ascending order.

13. The system of claim 9, wherein the streaming data comprises one of:
sequential data; or
time-series data.

14. The system of claim 9, wherein the inputs comprise a DNA sequence.

15. The system of claim 14, wherein detection of an anomaly indicates a DNA edit.

16. The system of claim 9, wherein the spiking neural network comprises leaky integrate-and-fire neurons.

17. A computer program product for anomaly detection for streaming data, the computer program product comprising:
a computer-readable storage medium having program instructions embodied thereon to implement a spiking neural network that performs the steps of:
receiving inputs of streaming data, wherein each input is contained within a number of neighborhoods, wherein the neighborhoods comprise a number of increasingly larger symmetrical numbers of inputs preceding and following the input;
converting the inputs into phase-coded spikes;
calculating, from the phase-coded spikes, a median value of each input for each size neighborhood containing the input;
calculating an absolute difference of each input from its median value for each size neighborhood containing the input;
calculating, from the absolute differences, a median absolute difference (MAD) value of each input for each size neighborhood containing the input;
determining for each input whether the MAD value for any size neighborhood containing the input exceeds a respective threshold, wherein;
responsive to a determination that the MAD value of one or more neighborhoods exceeds its threshold, outputting an anomaly indication for the input; and
responsive to a determination that none of the MAD values for the neighborhoods exceeds its threshold, outputting a normal indication for the input.

18. The computer program product of claim 17, further comprising instructions for normalizing the MAD values.

19. The computer program product of claim 17, further comprising instructions for routing the determination of whether the MAD value for any size neighborhood exceeds a respective threshold back as input for computing the median value of each input for each neighborhood.

20. The computer program product of claim 17, wherein phase-coding represents a neuron spiking delay for a specified length of time to allow processing the inputs in ascending order.

21. The computer program product of claim 17, wherein the streaming data comprises one of:
  sequential data; or
  time-series data.

22. The computer program product of claim 17, wherein the inputs comprise a DNA sequence.

23. The computer program product of claim 22, wherein detection of an anomaly indicates a DNA edit.

24. The computer program product of claim 17, wherein the spiking neural network comprises leaky integrate-and-fire neurons.

* * * * *